United States Patent
Horiguchi et al.

(10) Patent No.: US 7,460,202 B2
(45) Date of Patent: Dec. 2, 2008

(54) LIQUID CRYSTAL DEVICE AND ELECTRONIC APPARATUS

(75) Inventors: Masahiro Horiguchi, Nagano (JP); Masakatsu Higa, Nagano (JP)

(73) Assignee: Seiko Epson Corporation (JP)

( * ) Notice: Subject to any disclaimer, the term of this patent is extended or adjusted under 35 U.S.C. 154(b) by 573 days.

(21) Appl. No.: 11/105,966

(22) Filed: Apr. 14, 2005

(65) Prior Publication Data

US 2005/0243231 A1    Nov. 3, 2005

(30) Foreign Application Priority Data

Apr. 30, 2004  (JP) .............................. 2004-136631
Jan. 24, 2005  (JP) .............................. 2005-015908

(51) Int. Cl.
    *G02F 1/1343*    (2006.01)
(52) U.S. Cl. ...................................... 349/145; 349/144
(58) Field of Classification Search ......... 349/143–146, 349/55–56, 192
    See application file for complete search history.

(56) References Cited

U.S. PATENT DOCUMENTS

| | | | |
|---|---|---|---|
| 5,760,857 A * | 6/1998 | Yanagawa et al. ............. | 349/43 |
| 6,172,729 B1 * | 1/2001 | Ikeda ......................... | 349/145 |
| 6,429,916 B1 * | 8/2002 | Nakata et al. ................ | 349/106 |
| 6,628,367 B2 | 9/2003 | Hirabayashi et al. | |
| 6,728,805 B2 * | 4/2004 | Yoshida ....................... | 710/62 |
| 6,788,372 B1 * | 9/2004 | Kaise et al. .................. | 349/122 |
| 6,833,899 B2 | 12/2004 | Sunohara et al. | |
| 6,922,223 B2 | 7/2005 | Ma et al. | |
| 7,145,624 B2 * | 12/2006 | Kubo et al. .................. | 349/146 |

FOREIGN PATENT DOCUMENTS

| | | |
|---|---|---|
| CN | 1477427 A | 2/2004 |
| JP | 2001-235751 | 8/2001 |
| JP | 2002-031819 | 1/2002 |
| JP | 2003-043525 | 2/2003 |
| JP | 2003-315800 | 11/2003 |
| KR | 2002-0010541 | 2/2002 |

OTHER PUBLICATIONS

Examination result issued in corresponding Japanese application.
Communication from Korean Patent Office regarding corresponding application.

* cited by examiner

*Primary Examiner*—David C. Nelms
*Assistant Examiner*—Hoan C Nguyen
(74) *Attorney, Agent, or Firm*—Harness, Dickey & Pierce, P.L.C.

(57) ABSTRACT

A liquid crystal device includes a pair of substrates including a first substrate and a second substrate and a liquid crystal layer having a negative dielectric anisotropy and interposed between the first and second substrates. The first substrate includes a data line, a switching device connected to the data line, an insulating film formed on the data line and the switching device, a pixel electrode formed on the insulating film, and a contact hole to which the switching device and a wire extending from the pixel electrode are connected.

7 Claims, 12 Drawing Sheets

LIQUID CRYSTAL DEVICE AND ELECTRONIC APPARATUS

RELATED APPLICATIONS

This application claims priority to Japanese Patent Application Nos. 2004-136631 filed Apr. 30, 2004 and 2005-015908 filed Jan. 24, 2005 which are hereby expressly incorporated by reference herein in their entirety.

BACKGROUND OF THE INVENTION

1. Technical Field

The present invention relates to vertically aligned liquid crystal devices and a technique for reducing disturbance in the alignment of liquid crystal molecules in a display section.

2. Related Art

Vertically aligned liquid crystal devices in which an alignment of liquid-crystal molecules is controlled to reduce dependency on a viewing angle and increase a viewing angle range are known. In a typical vertically aligned liquid crystal device, liquid crystal having a negative dielectric anisotropy is used. When no voltage is applied between a device substrate and an opposing substrate, liquid crystal molecules are aligned vertically with respect to the substrates. Thin film transistors (TFT) and thin film diodes (TFD) are provided on the device substrate as switching devices, and pixel electrodes which each includes a plurality of substantially circular or polygonal sub-pixel electrodes are also formed on the device substrate. In addition, slits or protrusions (projections) are formed on the opposing substrate at positions corresponding to substantially central areas of the sub-pixel electrodes. When a voltage is applied between the device substrate and the opposing substrate, an electric field corresponding to the voltage is generated in a liquid-crystal layer between the substrates. Since the sub-pixel electrodes are substantially circular or polygonal and slits or protrusions are formed on the opposing substrate, the liquid crystal molecules are aligned radially around the substantially central areas of the sub-pixel electrodes. Therefore, the dependency on the viewing angle is reduced and the viewing angle range is increased. An example of a vertically aligned liquid crystal device is disclosed in Japanese Unexamined Patent Application Publication No. 2003-43525.

SUMMARY

An advantage of the invention is that disturbance in the alignment of liquid crystal molecules in a display section is reduced and high-quality display is achieved in a vertically aligned liquid crystal device and an electronic apparatus including the vertically aligned liquid crystal device.

According to a first aspect of the invention, a liquid crystal device includes a pair of substrates including a first substrate and a second substrate and a liquid crystal layer having a negative dielectric anisotropy and interposed between the first and second substrates. The first substrate includes a data line, a switching device connected to the data line, an insulating film formed on the data line and the switching device, a pixel electrode formed on the insulating film, and a contact hole to which the switching device and a wire extending from the pixel electrode are connected. It is preferable that the contact hole is formed at a farthest position from the pixel electrode in a pixel area, for example, an area including sub-pixel electrodes (hereafter also called a "sub-pixel area") corresponding to red (R), green (G), or blue (B). More specifically, the contact hole may be formed at, for example, a corner of the pixel area or the sub-pixel area.

The liquid crystal device according to the first aspect of the invention is suitable for use as a vertically aligned liquid crystal device which includes a pair of substrates and a liquid crystal layer having a negative dielectric anisotropy interposed between the substrates. When no voltage is applied, the longitudinal direction of each liquid crystal molecule in the liquid crystal layer is aligned vertically with respect to the substrates. One of the substrates includes a data line, a switching device such as a TFD and a TFT, an insulating film formed on the data line and the switching device, a pixel electrode formed on the insulating film, and a contact hole to which the switching device and a wire extending from the pixel electrode are connected, and has a so-called overlayer structure. In a preferred embodiment, the pixel electrode and the wire are formed in a single layer. The wire and the pixel electrode are made of the same material (for example, ITO), and the wire extends from the peripheral edge of the lowermost sub-pixel electrode to the contact hole in the sub-pixel area. Thus, the contact hole is disposed at a position where the pixel electrode does not overlap the contact hole. Therefore, the liquid crystal in an area corresponding to the pixel electrode, that is, in the effective display area which defines a display section, is not easily influenced by the disturbance in the liquid crystal alignment generated at the contact hole. Accordingly, the disturbance in the liquid crystal alignment in the effective display area is prevented. As a result, unevenness in the display, afterimage/burn-in, reduction in the response speed in drive control, etc., are prevented and the quality of the displayed image is improved. In addition, since the contact hole is formed at a position where the pixel electrode does not overlap the contact hole, reduction in the opening ratio is prevented.

In the above-described liquid crystal device, one of the first and second substrates may include a light-shading film at a position where the light-shading film overlaps the contact hole. Accordingly, the area corresponding to the contact hole where the disturbance in the liquid crystal alignment is generated is hidden and the display contrast is increased.

According to a second aspect of the invention, a liquid crystal device includes a pair of substrates and a liquid crystal layer having a negative dielectric anisotropy and interposed between the substrates. One of the substrates includes a data line, a switching device connected to the data line, an insulating film formed on the data line and the switching device, a pixel electrode formed on the insulating film, and a contact hole which connects the switching device and the pixel electrode. In addition, one of the substrates includes a light-shading film, and the contact hole is formed at a position where the light-shading film overlaps the contact hole.

The liquid crystal device according to the second aspect of the invention is suitable for use as a vertically aligned liquid crystal device which includes a pair of substrates and a liquid crystal layer-having a negative dielectric anisotropy interposed between the substrates. When no voltage is applied, the longitudinal direction of each liquid crystal molecule in the liquid crystal layer is aligned vertically with respect to the substrates. One of the substrates includes a data line, a switching device such as a TFD and a TFT, an insulating film formed on the data line and the switching device, a pixel electrode formed on the insulating film, and a contact which connects the switching device and the pixel electrode, and has a so-called overlayer structure.

It is preferable that the insulating film is formed on one of the substrates at a position corresponding to areas between sub-pixel areas, and the contact hole is formed at a position where the light-shading film overlaps the contact hole. Therefore, the liquid crystal in an area corresponding to the pixel electrode, that is, in the effective display area which defines a display section, is not easily influenced by the disturbance in the liquid crystal alignment generated at the contact hole. Accordingly, the disturbance in the liquid crystal alignment in the effective display area is prevented. As a result, unevenness in the display, afterimage/burn-in, reduction in the response speed in drive control, etc., are prevented and the quality of the displayed image is improved. In addition, since the contact hole is formed at a position where the light-shading film overlaps the contact hole, the pixel electrode is formed at a position where it does not overlap the contact hole. Therefore, reduction in the opening ratio is prevented.

In addition, it is preferable that the pixel electrode includes a plurality of sub-pixel electrodes, the sub-pixel electrodes being electrically connected to each other and being arranged in a direction in which the data line extends, and the contact hole is positioned between two of the sub-pixel electrodes which are adjacent to each other in the direction in which the data line extends.

In this case, the pixel electrode may include a plurality of sub-pixel electrodes which each has a polygonal or substantially circular shape in a plan view. In addition, the sub-pixel electrodes are electrically connected to each other and are arranged in a direction in which the data line extends. The reason why a plurality of sub-pixel electrodes are formed in a single sub-pixel area is because the alignment state of the liquid crystal molecules can be more easily controlled when the size of each sub-pixel electrode is relatively small. More specifically, the alignment of the liquid crystal molecules can be more accurately controlled compared to the case in which each pixel includes a single, large sub-pixel electrode.

In particular, in the liquid crystal device according to the above-described embodiment, the contact hole is positioned between two of the sub-pixel electrodes which are adjacent to each other in the direction in which the data line extends. Accordingly, the distance from the contact hole to the two adjacent sub-pixel electrodes is set as long as possible. Therefore, the liquid crystal in an area corresponding to the pixel electrode, that is, in the effective display area which defines a display section, is not easily influenced by the disturbance in the liquid crystal alignment generated at the contact hole. Accordingly, the disturbance in the liquid crystal alignment in the effective display area is prevented. As a result, unevenness in the display, afterimage/burn-in, reduction in the response speed in drive control, etc., are prevented and the quality of the displayed image is improved. In addition, since the contact hole is formed at a position where the pixel electrode does not overlap the contact hole, reduction in the opening ratio is prevented.

It is preferable that the second substrate may has a black light-shading film at a position corresponding to the contact hole. Accordingly, the area corresponding to the contact hole where the disturbance in the liquid crystal alignment is generated is made invisible by the black light-shading film and the display contrast is increased.

In addition, it is preferable that the second substrate has openings or protrusions at positions corresponding to substantially central areas of the sub-pixel electrodes. In this case, the liquid crystal alignment is controlled such that the liquid crystal molecules are arranged radially in areas between the openings or the protrusions formed at the substantially central areas of the sub-pixel electrodes and the polygonal or substantially circular sub-pixel electrodes. Accordingly, the viewing angle range is increased in the vertically aligned liquid crystal display device.

In addition, it is preferable that the data line on the first substrate does not overlap the contact hole. In this case, the data line is preferably formed on the first substrate so as to go around the contact hole. Accordingly, the data line is prevented from being connected to the contact hole.

In addition, an electronic apparatus according to an embodiment of the invention includes the above-described liquid crystal device.

BRIEF DESCRIPTION OF THE DRAWINGS

The invention will be described with reference to the accompanying drawings, wherein like numbers reference like elements, and wherein.

DESCRIPTION OF THE EMBODIMENTS

First Embodiment

Structure of Liquid Crystal Display Device

Figure 1:
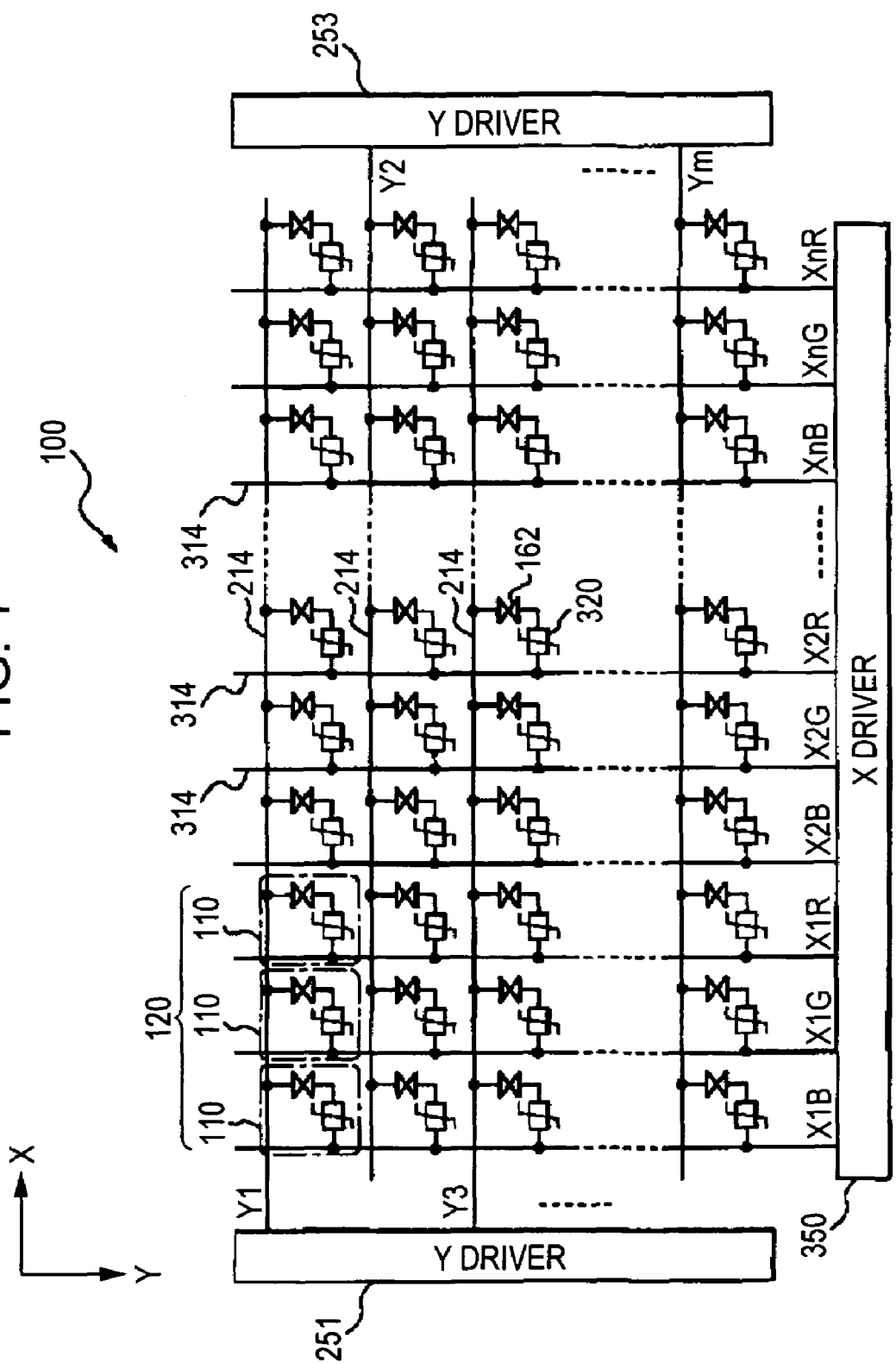
FIG. 1 is a block diagram showing the electrical structure of a liquid crystal display device according to a first embodiment of the invention.

First, the electrical structure of a vertically aligned liquid crystal display device according to a first embodiment of the invention will be described below. FIG. 1 is a block diagram showing the electrical structure of the display device. As shown in FIG. 1, a liquid crystal display device 100 includes m scan lines (common wires) 214 extending in a row (X) direction and 3n data lines (segment wires) 314 extending in a column (Y) direction. Pixels 110 are formed in correspondence with intersections of the scan lines 214 and the data lines 314. Each pixel 110 corresponds to one of red (R), green (G), and blue (B), and three pixels 110 corresponding to R, G, and B which are adjacent to each other in the X direction form a single dot 120.

Each pixel 110 includes a liquid crystal capacitor 162 and a thin film diode (TFD) 320, which is an example of a two-terminal switching device, and the liquid crystal capacitor 162 and the TFD 320 are connected to each other in series. In each liquid crystal capacitor 162, liquid crystal, which is an example of an electrooptic material, is interposed between the corresponding scan line 214, which functions as an opposing electrode, and a pixel electrode. In addition, each TFD 320 is connected to the corresponding data line 314 at one end and the pixel electrode at the other end, and is switched on and off in accordance with a potential difference between the scan line 214 and the data line 314. For convenience of description, the total number of scan lines 214 is defined as m and the total number of data lines 314 is defined as 3n in this display device, and accordingly the display device will be described as a matrix display device in which the dots 120 are arranged in m rows and n columns (in other words, the pixels 110 are arranged in m rows and 3n columns). However, the invention is not limited to this.

Y drivers 251 and 253 are generally called scan-line driving circuits. The Y driver 251 drives the $N^{th}$ scan lines 214 from the top in FIG. 1, N being the odd numbers (1, 3, 5, . . . , and m−1), and the Y driver 253 drives the $M^{th}$ scan lines 214 from the top, M being the even numbers (2, 4, 6, . . . , and m). More specifically, the Y drivers 251 and 253 alternately selects the first, second, third, . . . , and $m^{th}$ scan lines 214 one by one in a single vertical scanning period. The selected scan line 214 receives a scanning signal of a selected voltage, and the other (unselected) scan lines 214 receive a scanning signal of an unselected voltage. For convenience of description, a scanning signal supplied to the $j^{th}$ scan line 214 from the top (j is an integer which satisfies $1 \leq j \leq m$) is denoted as Yj.

In addition, an X driver 350 is generally called a data-line driving circuit, and supplies data signals X1B, X1G, X1R, X2B, X2G, X2R, . . . , XnB, XnG, and XnR corresponding to display contents to the 3n pixels 110 placed on the scan line 214 selected by one of the Y drivers 251 and 253 via the respective data lines 314. Data signals supplied to the data line 314 common to B, G, and R pixels 110 in the $i^{th}$ dot 120 (i is an integer which satisfies $1 \leq i \leq n$) are denoted as XiB, XiG, and XiR, respectively.

Figure 2:
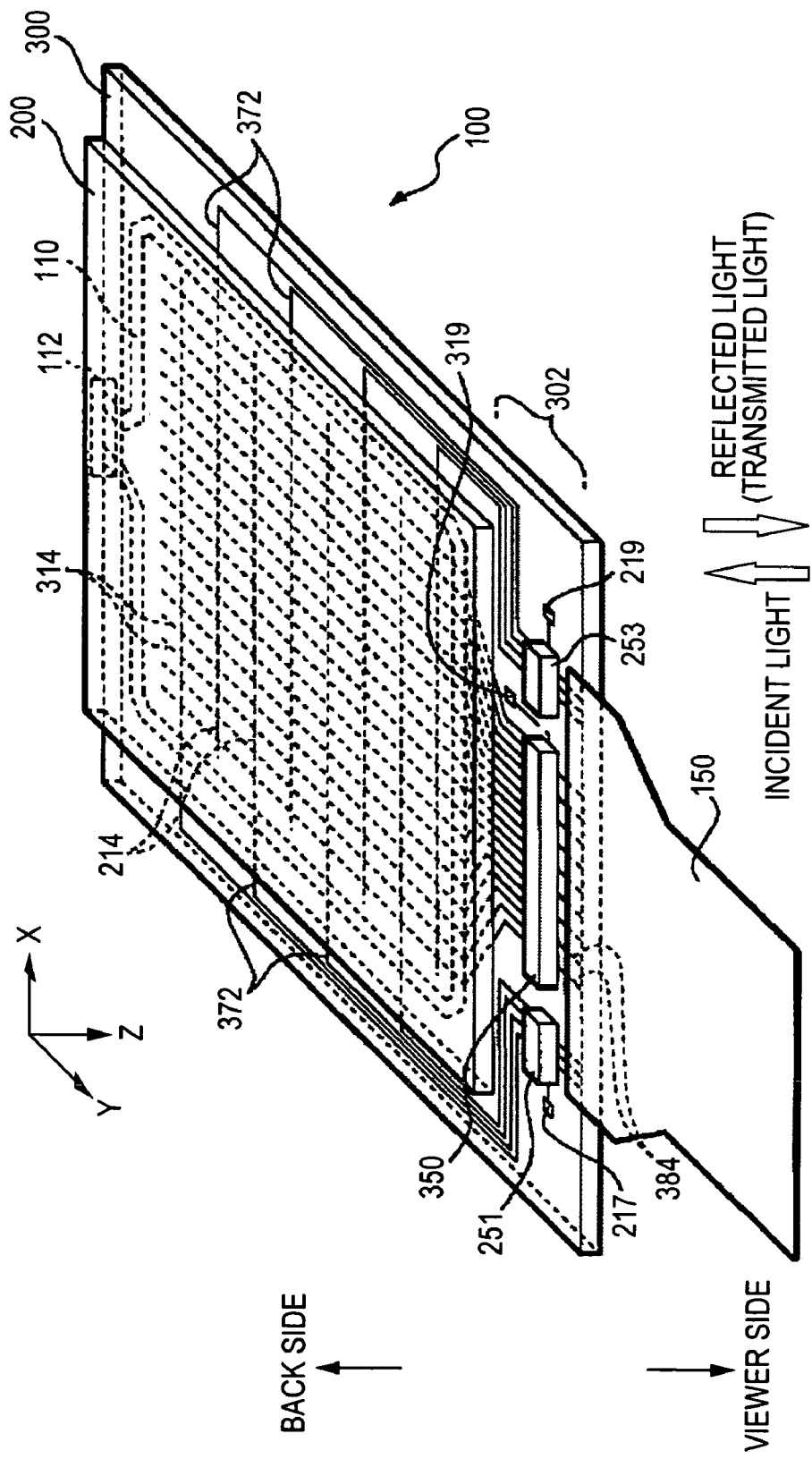
FIG. 2 is a perspective view showing the structure of the liquid crystal display device.
Figure 3:
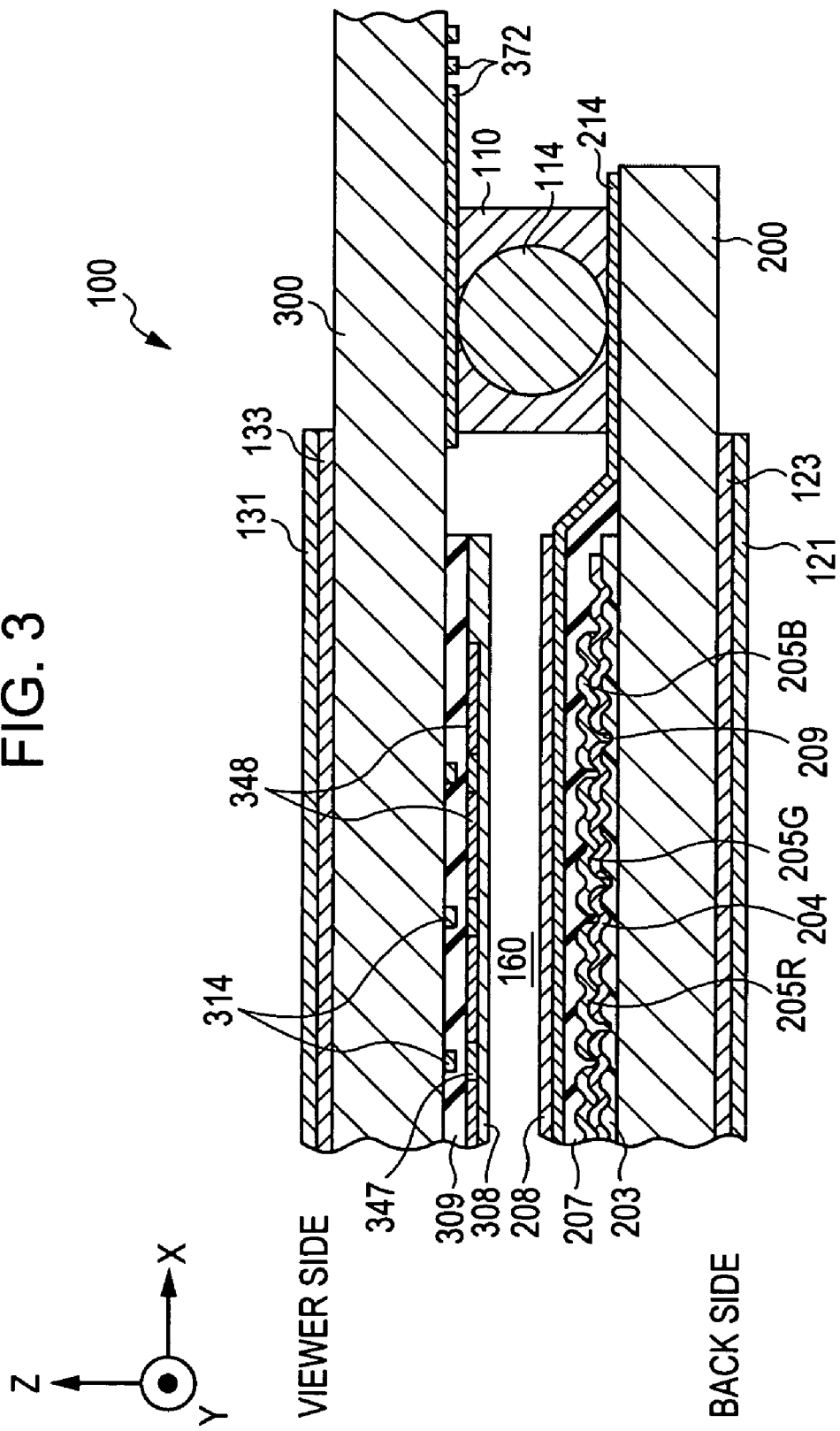
FIG. 3 is a partial sectional view of the liquid crystal display device taken along an X direction.

Next, the mechanical structure of the liquid crystal display device 100 will be described below. FIG. 2 is a perspective view showing the external structure of the liquid crystal display device 100. In this figure, in order to facilitate understanding of a wiring layout in the liquid crystal display device 100, the liquid crystal display device 100 is oriented such that a viewer side which is normally viewed by a viewer faces backward and a back side which is normally not viewed by the viewer faces frontward. FIG. 3 is a partial sectional view of the liquid crystal display device 100 taken along the X direction in FIG. 2, and the viewer side faces upward in FIG. 3. Accordingly, it should be noted that the liquid crystal display device 100 is shown in opposite orientations in the vertical direction in FIG. 2 and FIG. 3.

As shown in FIGS. 2 and 3, the liquid crystal display device 100 includes a substrate 300 facing the viewer side and a substrate 200 disposed behind the substrate 300, and the substrate 200 is smaller than the substrate 300. The substrates 200 and 300 are laminated to each other with a sealing material 110, and conductive particles 114, which also function as spacers, are dispersed in the sealing material 110 at a suitable density so that a uniform gap is provided between the substrates 200 and 300. In addition, liquid crystal 160 having a negative dielectric anisotropy, for example, is sealed in the gap. The sealing material 110 is applied along an inner periphery of the substrate 200 with an opening provided therein so that the liquid crystal 160 can be injected. After the liquid crystal 160 is injected, the opening is sealed with a sealant 112.

In addition, m scan lines 214 which extend in the X direction are provided on a surface of the substrate 200 which faces the substrate 300 on the viewer side, and 3n data lines 314 which extend in the Y (column) direction are provided on a surface of the substrate 300 which faces the substrate 200 on the back side. Among the scan lines 214 provided on the substrate 200, the $N^{th}$ scan lines 214, N being the odd numbers, extend to the left end of an area where the sealing material 110 is formed in FIG. 2, and $M^{th}$ scan lines 214, M being the even numbers, extend to the right end of the area where the sealing material 110 is formed. In addition, wires 372 are formed on the substrate 300 in one-to-one correspondence with the scan lines 214 such that the wires 372 face their respective scan lines 214 in the area-where the sealing material 110 is formed.

The conductive particles 114 are dispersed in the sealing material 110 at a density such that at least one conductive particle 114 is disposed in an area where an end of each scan line 214 and an end of the corresponding wire 372 face each other. Accordingly, the scan lines 214 on the substrate 200 are connected to the respective wires 372 on the substrate 300 via the conductive particles 114. The wires 372 have a laminate structure obtained by forming a pattern in the same layer as a second metal layer in each TFD 320 and the pixel electrodes 348, and the wiring resistance is set low. Half of the wires 372 which are connected to the $N^{th}$ scan lines 214, N being the odd numbers, are bent at 90° in an area outside the sealing material 100, extend in the Y direction to a protruding portion 302, and are bonded to output bumps of the Y driver 251 on the protruding portion 302. Similarly, the other half of the wires 372 which are connected to the $M^{th}$ scan lines 214, M being the even numbers, are bent at 90° in the area outside the sealing material 100, extend in the Y direction to the protruding portion 302, and are bonded to output bumps of the Y driver 253.

The data lines 314 extend to the protruding portion 302 with the pitch therebetween being reduced in the area outside the sealing material 100. The data lines 314 are bonded to output bumps of the X driver 350 on the protruding portion 302. The protruding portion 302 is connected to a flexible circuit board (FPC) substrate 150, and clock signals and control signals are supplied to input bumps of the Y drivers 251 and 253 and the X driver 350 form an external circuit (not shown). Wires 384 are formed on the protruding portion 302 of the substrate 300, and are connected to the input bumps of the Y drivers 251 and 253 and the X driver 350 at one end and to wires on the FPC substrate 150 at the other end.

In order to facilitate understanding, FIG. 2 shows a case in which the number m of the scan lines 214 is eight and the number 3n of the data lines 314 is eighteen for convenience. In addition, the protruding portion 302 is provided with terminals 217, 219, and 319 for tests. These terminals will be described below.

Internal Structure

Next, the internal structure of a display area in the liquid crystal display device 100 will be described below. As shown in FIG. 3, a retardation plate 133 and a polarizing plate 131 are laminated on an outer surface of the substrate 300 on the viewer side. The retardation plate 133 and the polarizing plate 131 are omitted in FIG. 2 for simplicity. In addition, the data lines 314 made of chromium or the like are formed on the inner surface of the substrate 300 so as to extend in the Y direction (direction perpendicular to the page in FIG. 3). An overlayer 309, which is an insulating film made of a resin material having a dielectric constant lower than that of the liquid crystal 160, is formed on the surfaces of the data lines 314 and the inner surface of the substrate 300. In addition, the pixel electrodes 348 made of a transparent conductive material, such as indium tin oxide (ITO), and a black light-shading film 347 are formed on the inner surface of the overlayer 309. The black light-shading film 347 is formed so as to surround each of the pixel electrodes 348, and the pixel electrodes 348 are divided from each other by the black light-shading film 347. In this liquid crystal display device 100, the black light-shading film 347 is formed on the substrate 300. However, the black light-shading film 347 may also be formed on the substrate 200 at a position corresponding to the peripheral area of each pixel electrode 348. The detailed structures of the data lines 314 and the pixel electrodes 348 will be described below. A vertical alignment film 308 is formed on the surfaces of the pixel electrodes 348. The vertical alignment film 308 is not provided in the area near and outside the sealing material 110 since it is only necessary in the display area.

Next, the substrate 200 on the back side will be described. A retardation plate 123 and a polarizing plate 121 are laminated on the outer surface of the substrate 200. The retardation plate 123 and the polarizing plate 121 are also omitted in FIG. 2. A light-scattering resin layer 203 having an irregular surface is formed on the inner surface of the substrate 200. The light-scattering resin layer 203 is formed by, for example, heating photoresist applied to the substrate 200 and formed in a dot pattern and softening the edges of the dot-shaped photoresist pattern.

A reflective film 204 made of reflective metal, such as aluminum and silver, are formed on the irregular surface of the light-scattering resin layer 203. Accordingly, the reflective film 204 also has an irregular surface corresponding to that of the light-scattering resin layer 203. Therefore, light from the viewer side is scattered when it is reflected by the reflective film 204. The liquid crystal display device 100 functions not only as a reflective liquid crystal display device but also as a transmissive liquid crystal display device, and therefore the reflective film 204 has openings 209 for allowing light to pass therethrough. The openings 209 may also be omitted if the thickness of the light-reflecting metal film made of aluminum or the like is reduced to about 20 nm to 50 nm so that a part of light from the back side can pass through the metal film.

In addition, a red color filter 205R, a green color filter 205G, and a blue color filter 205B are arranged on the surface of the reflective film 204 in a predetermined pattern at positions corresponding to the pixel electrodes 348 and the scan lines 214. In the present embodiment, the color filters 205R, 205G, and 205B are arranged in a striped pattern which is suitable for displaying data.

Next, a flattening film 207 made of an insulating material is formed on the surfaces of the color filters 205R, 205G, and 205B for flattening the steps of the color filters and the irregular surface of the reflective film 204. In addition, the scan lines 214 made of a transparent conductive material, such as ITO, are formed on the flat surface of the flattening film 207 so as to extend in the X direction (horizontal direction in FIG. 3) and face the pixel electrodes 348 formed on the substrate 300 on the viewer side. A vertical alignment film 208 made of polyimide or the like is formed on the surfaces of the scan lines 214. The vertical alignment film 208 is subjected to a rubbing process in a predetermined direction before it is laminated on the substrate 300 on the viewer side. In addition, the color filters 205R, 205G, and 205B, the flattening film 207, and the vertical alignment film 208 are not provided in the are near and outside the sealing material 110 since they are only necessary in the display area.

Pixel Structure

Next, the pixel structure of the liquid crystal display device 100 will be described below with reference to FIGS. 4 and 5.

Figure 4:
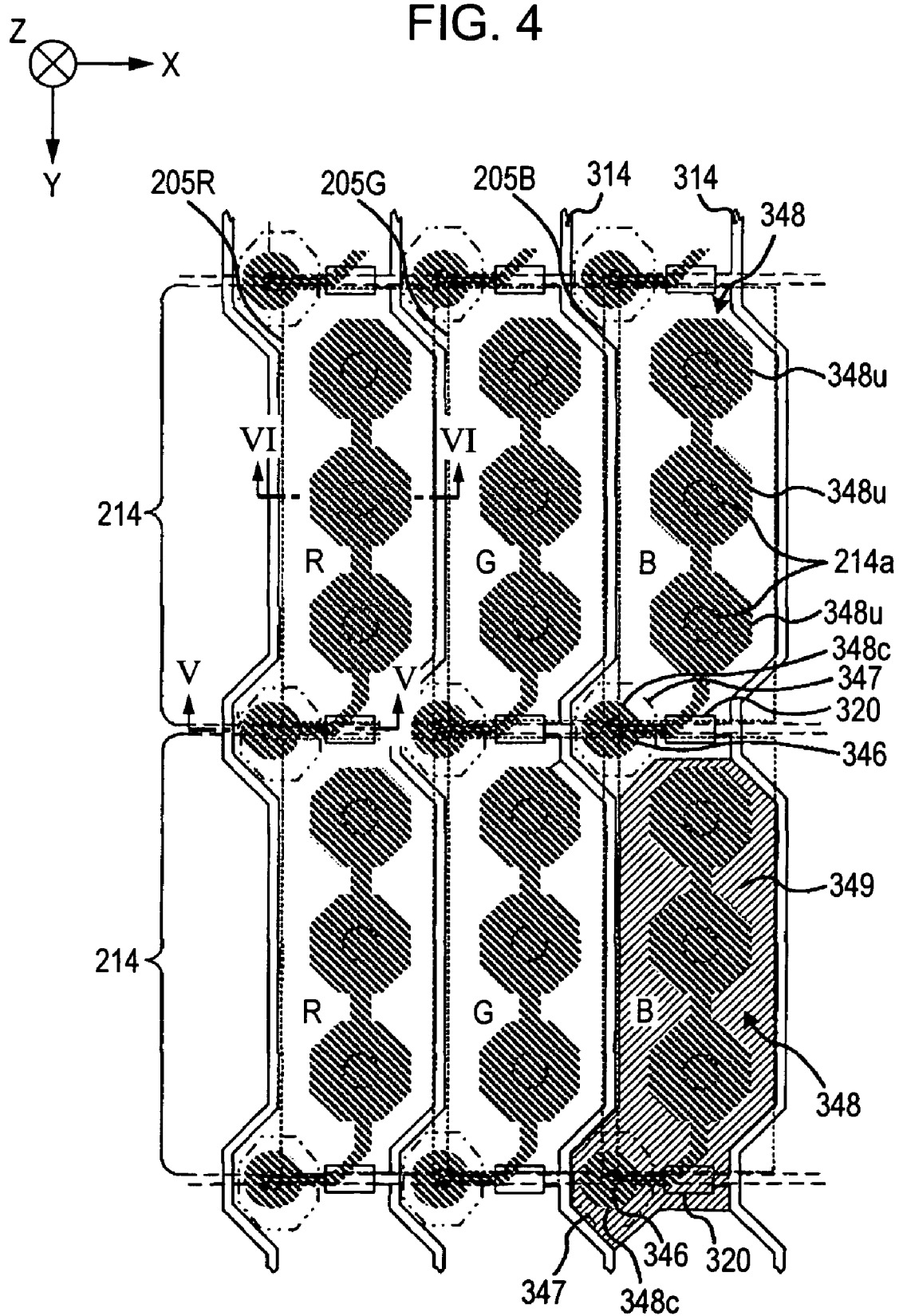
FIG. 4 is a plan view showing the structure of pixel electrodes according to the first embodiment.

FIG. 4 is a partial plan view showing a layout of the pixel electrodes 348. FIG. 5 is a sectional view of FIG. 4 taken along line V-V, that is, a sectional view of an area around a contact hole 346. FIG. 4 shows the structure viewed from the back side, and accordingly the front side in FIG. 4 and the top side in FIG. 5 corresponds to the back side of the display device. In addition, for convenience, the TFDs 320 and the data lines 314 are shown by solid lines in FIG. 4. In addition, in FIGS. 4 and 5, the black light-shading film 347 formed in areas between sub-pixel areas 349 are omitted.

The liquid crystal display device 100 according to the first embodiment of the invention is a vertically aligned liquid crystal display device having an overlayer structure. Therefore, in the liquid crystal display device 100, the pixel electrodes 348 are insulated from the data lines 314 and the TFDs 320 by the overlayer 309, which functions as an insulating film, and are electrically connected to the data lines 314 and the TFDs 320 via contact holes 346, as described below. In addition, the liquid crystal display device 100 according to the first embodiment of the invention has a normally black mode.

As shown in FIG. 4, each pixel electrode 348 includes a plurality of (three in this embodiment) polygonal transparent electrode sections (hereafter called "sub-pixel electrodes 348u") which are connected to each other. Each pixel electrode 348 is disposed in the corresponding sub-pixel area 349 (hatched area in the figure). In the vertically aligned liquid crystal display device, the liquid crystal molecules are arranged radially around the sub-pixel electrodes 348u. Therefore, the sub-pixel electrodes 348u preferably have a polygonal or circular shape in which the peripheral edge is at a substantially constant distance from the center point. In the embodiment shown in FIG. 4, three sub-pixel electrodes 348u are arranged in series. The reason why a plurality of sub-pixel electrodes 348u are formed in a single sub-pixel area 349 is because the alignment state of the liquid crystal molecules can be more easily controlled when the size of each sub-pixel electrode 348u is relatively small. More specifically, the alignment of the liquid crystal molecules can be more accurately controlled compared to the case in which each pixel includes a single, large sub-pixel electrode.

The pixel electrodes 348 are arranged in a matrix pattern on the inner surface of the overlayer 309 formed on the substrate 300. The pixel electrodes 348 face substantially rectangular color filters 205 corresponding to red (R), green (G), and blue (B). In addition, each of the pixel electrodes 348 has a connecting portion 348c, which functions as a wire for providing connection to the corresponding TFD 320. The connecting portions 348c are made of the same material (for example, ITO) as the pixel electrodes 348. Each of the connecting portions 348c extends from the peripheral edge of the lowermost sub-pixel electrode 348u in the corresponding sub-pixel area 349 and extends to the corresponding contact hole 346. The pixel electrodes 348 in the same column are connected to a single data line 314 via the respective TFDs 320 at positions corresponding to the contact holes 346. In addition, the pixel electrodes 348 in the same row face a single scan line 214 (shown by dashed lines), as described above.

Each of the TFDs 320 includes a first TFD section 320a and a second TFD section 320b. In addition, each pair of the first and second TFD sections 320a and 320b includes an island-shaped first metal layer 322 made of tantalum tungsten, an insulating film 323 formed by anodizing the surface of the first metal film 322, and second metal films 316 and 336 which are formed on the surface of the insulating film 323 and are separated from each other. The second metal films 316 and 336 are obtained by forming a pattern in a single conductive film made of chromium or the like. The second metal film 316 extends from the corresponding data line 314 in a shape like the letter 'T', and the second metal film 336 is used for providing connection to the connecting portion 348c of the corresponding pixel electrode 348 made of ITO or the like.

In each TFD 320, the first TFD section 320a includes the second metal film 316, the insulating film 323, and the first metal film 322, in that order from the data line 314, and has a metal-insulator-metal structure. Accordingly, the current-voltage characteristic of the first TFD section 320a is nonlinear in both the positive and negative directions. In addition, the second TFD section 320b includes the first metal film 322, the insulating film 323, and the second metal film 336, in that order from the data line 314, and has a structure reverse to that of the first TFD section 320a. Therefore, the current-voltage characteristic of the second TFD section 320b is symmetric to that of the first TFD section 320a about the origin. Since the TFD 320 is structured such that the two TFD sections are connected to each other in series in the opposite orientations, the nonlinear current-voltage characteristic of the TFD 320 is symmetric in positive and negative directions compared to the case in which the device includes a single section.

The overlayer 309 has openings, that is, the contact holes 346 which each has a substantially circular shape in a plan view. The connecting portion 348c of each pixel electrode 348 is electrically connected to the corresponding TFD 320 and the data line 314 via the corresponding contact hole 346. The detailed structure of this area will be described below with reference to the sectional view shown in FIG. 5. With reference to FIG. 5, the TFD 320 and the data line 314 are formed on the substrate 300. A first metal film 312 and an insulating film 313 are laminated on the substrate 300 under the data line 314. In addition, the overlayer 309 is laminated on the inner surface of the substrate 300 and the surfaces of the TFD 320 and the data line 314. In addition, the contact hole 346 is formed at a position near the left end of the second metal film 336 in FIG. 5. The connecting portion 348c of the pixel electrodes 348 is connected to the second metal film 336 of the TFD 320 in the contact hole 346.

Figure 5:
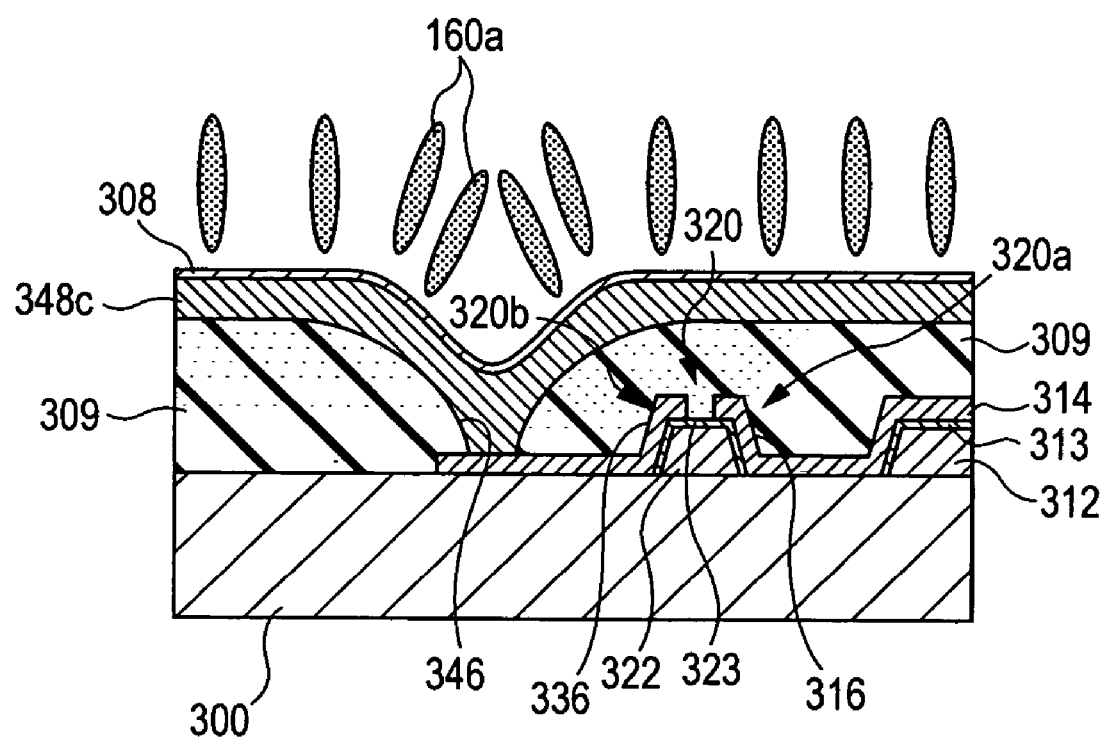
FIG. 5 is a sectional view of an area around a contact hole according to the first embodiment.

As shown in FIG. 5, in the vertically aligned liquid crystal device having the overlayer structure, liquid crystal molecules 160a are aligned vertically in an initial alignment state of the liquid crystal in which no voltage is applied. However, the liquid crystal molecules 160a positioned above the contact hole 349 are influenced by the inclined surface of the contact hole 346, and therefore disturbance in the liquid crystal alignment is generated in this area, as shown in FIG. 5. Accordingly, if the contact hole 346 is formed in an effective display area of the pixel electrode 348, that is, in an area corresponding to or near the sub-pixel electrodes 348u, the liquid crystal in the effective display area is influenced by the disturbance in the liquid crystal alignment generated at the contact hole 346. As a result, unevenness in the display, afterimage/burn-in, reduction in the response speed in drive control, etc., may occur. In order to prevent this, the contact hole 346 is preferably formed at a position where the pixel electrode 348 does not overlap the contact hole 346 in each sub-pixel area 349. More preferably, the contact hole 346 is disposed at a farthest position from the pixel electrode 348 in each sub-pixel area 349.

As shown in the plan view of FIG. 4, in the liquid crystal display device 100 according to the first embodiment of the invention, each of the connecting portions 348c extends from the peripheral edge of the lowermost sub-pixel electrode 348u to the contact hole 346 in the corresponding sub-pixel area 349. In addition, the connecting portion 348c and the TFD 320 are connected to each other at the contact hole 346. Thus, the contact hole 346 is disposed at a position where the pixel electrode 348 does not overlap the contact hole 346. In the liquid crystal display device 100 according to the first embodiment of the invention, each contact hole 346 is preferably disposed at a farthest position from the pixel electrode 348 in the corresponding sub-pixel area 349, more specifically, at a corner of the sub-pixel area 349. In addition, the contact hole 346 is formed at a position corresponding to the black light-shading film 347 provided between the sub-pixel areas 349. Thus, the distance from the contact hole 346 to the sub-pixel electrodes 348u defining the effective display area is set as long as possible. Therefore, the liquid crystal in an area corresponding to the sub-pixel electrodes 348u, that is, in the effective display area which defines a display section, is not easily influenced by the disturbance in the liquid crystal alignment generated at the contact hole 346. Accordingly, the disturbance in the liquid crystal alignment in the effective display area is prevented. As a result, in the liquid crystal display device 100 according to the first embodiment of the invention, unevenness in the display, afterimage/burn-in, reduction in the response speed in drive control, etc., are prevented and the quality of the displayed image is improved. In addition, since the contact hole 346 is formed at a position where the pixel electrode 348 does not overlap the contact hole 346, reduction in the opening ratio is prevented.

In addition, as described above, the liquid crystal display device 100 according to the first embodiment has a normally black mode. Therefore, even if the contact holes 346 are not covered by the black light-shading film 347, the corresponding areas appear black in the initial alignment state. However, there is a possibility that the contrast will be reduced because of the disturbance in the liquid crystal alignment at the contact holes 346. Therefore, in the present embodiment, the black light-shading film 347 is formed on the substrate 200 so as to cover the positions corresponding to the contact holes 346 (only the corresponding positions are shown in FIG. 4 for convenience). Accordingly, the areas corresponding to the contact holes 346 where the disturbance in the liquid crystal alignment is generated are hidden and the display contrast is increased.

In addition, in the pixel structure according to the present embodiment, if the data lines 314 extend linearly in the Y direction, the data lines 314 would overlap the contact holes 346 and be connected to the contact holes 346, as is clear from FIG. 4. Therefore, in the present embodiment, the data lines 314 are formed so as to go around the contact holes 346. More specifically, as shown in FIG. 4, the data lines 314 are formed on the inner surface of the substrate 300 in such a manner that the data lines 314 do not overlap the contact holes 346. Accordingly, the data lines 314 are prevented from being connected to the contact holes 346.

Figure 6A:
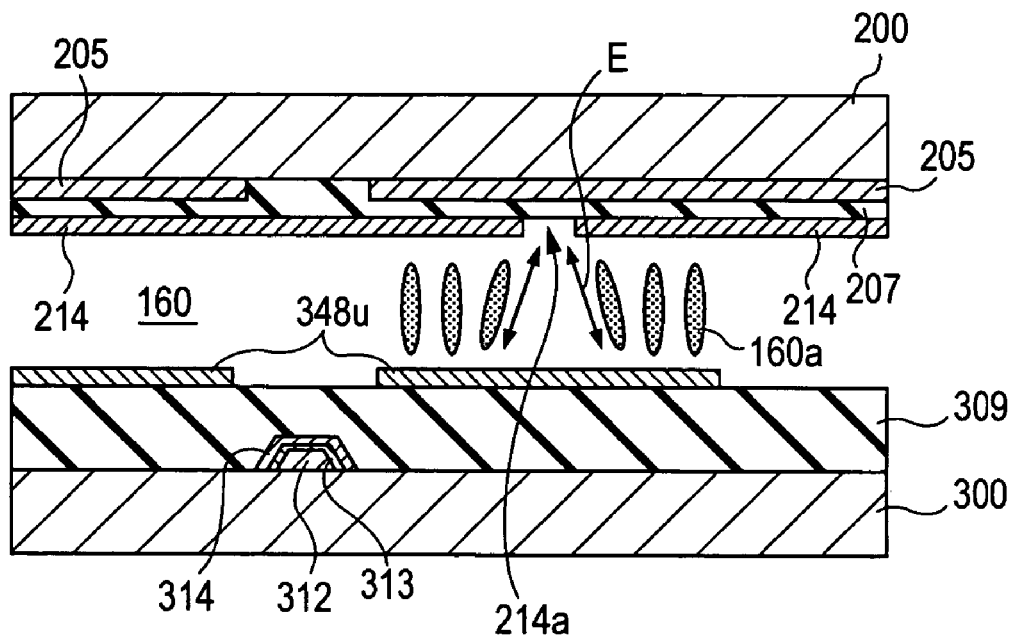
FIGS. 6A and 6B are cross sectional views of an area including a sub-pixel electrode according to the first embodiment.
Figure 6B:
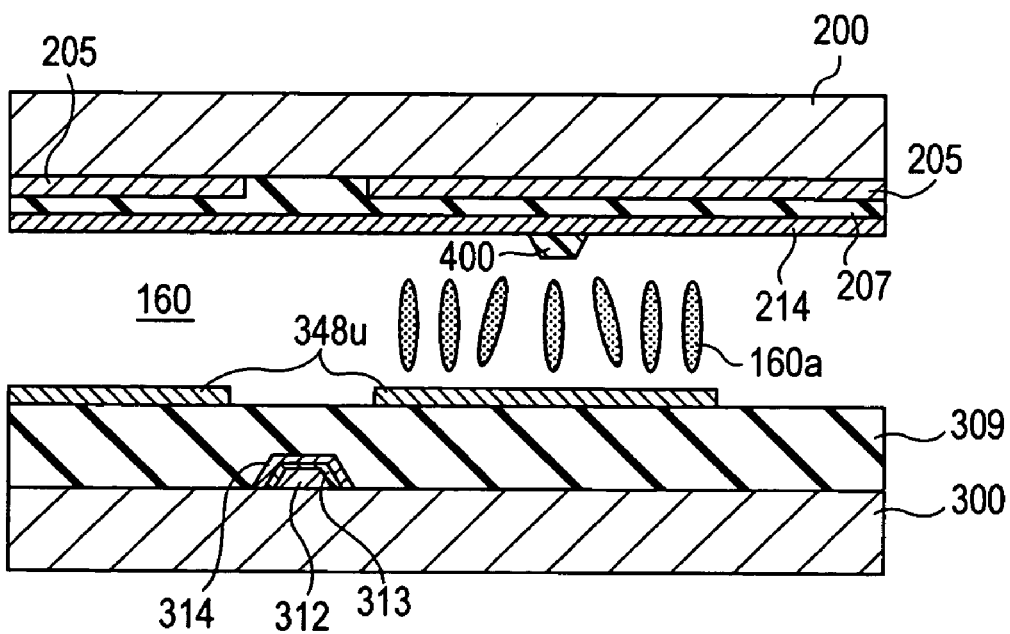

Next, the cross-sectional structure of an area around a single sub-pixel electrode 348u will be described below with reference to FIGS. 6A and 6B. FIGS. 6A and 6B also show the structure of the opposing substrate 200. In FIGS. 6A and 6B, the upper side corresponds to the back side and the lower side corresponds to the viewer side (the vertical orientation of the substrate is the same as that in FIG. 4, and is reverse to that in FIG. 3).

FIG. 6A is a schematic sectional view of FIG. 4 taken along line VI-VI. As shown in the figure, the first metal film 312, the insulating film 313, and the data line 314 are formed on the inner surface of the substrate 300 on which the TFDs 320 are provided. In addition, the overlayer 309 is formed on the inner surface of the substrate 300 and on the surface of the data line 314, and the sub-pixel electrodes 348u are formed on the inner surface of the overlayer 309. Although not shown in FIG. 6A, the vertical alignment film 308 is formed on the inner surface of the overlayer 309 and the surfaces of the sub-pixel electrodes 348*u* (see FIG. 3).

Although not shown in FIG. 6A, the light-scattering resin layer 203 is formed on the inner surface of the opposing substrate 200, and the reflective film 204 is formed on the light-scattering resin layer 203 (see FIG. 3). In addition, the color filters 205 are formed on the inner surface of the reflective film 204. In addition, the flattening film 207 is formed on the inner surface of the color filters 205, and the scan line 214 is formed on the flattening film 207.

Each scan line 214 has openings 214*a* at positions corresponding to substantially central areas of the sub-pixel electrodes 348*u* (see FIG. 4). When a voltage is applied between the substrates, each of the openings 214*a* and the corresponding sub-pixel electrode 348*u* interact with each other to generate an oblique electric field E at the corresponding area (see the arrows shown in FIG. 6A). Accordingly, the tilt directions of the liquid crystal molecules 160*a* are restricted, and the liquid crystal alignment is controlled such that the liquid crystal molecules 160*a* are aligned radially in accordance with the voltage applied between the substrates. Thus, areas in which the liquid crystal molecules 160*a* are aligned radially are obtained.

In addition, in FIG. 6B, each scan line 214 has protrusions 400, which are projections made of resin, at positions corresponding to the substantially central areas of the sub-pixel electrodes 348*u*. Accordingly, the liquid crystal molecules 160*a* are aligned along the inclined surfaces of the protrusions 400 in the initial alignment state of the liquid crystal, and thus the tilt directions of the liquid crystal molecules 160*a* are restricted. Therefore, the liquid crystal alignment is controlled such that the liquid crystal molecules 160*a* are aligned radially in accordance with the voltage applied between the substrates. In other words, areas in which the liquid crystal molecules 160*a* are aligned radially are obtained. In the examples shown in FIGS. 6A and 6B, the opening 214*a* or the protrusion 400 is formed on the scan line 214 at a position corresponding to the substantially central area of each sub-pixel electrode 348*u*. However, the invention is not limited to this. For example, in the invention, both openings and protrusions may be formed on the scan lines 214.

Second Embodiment

Figure 7:
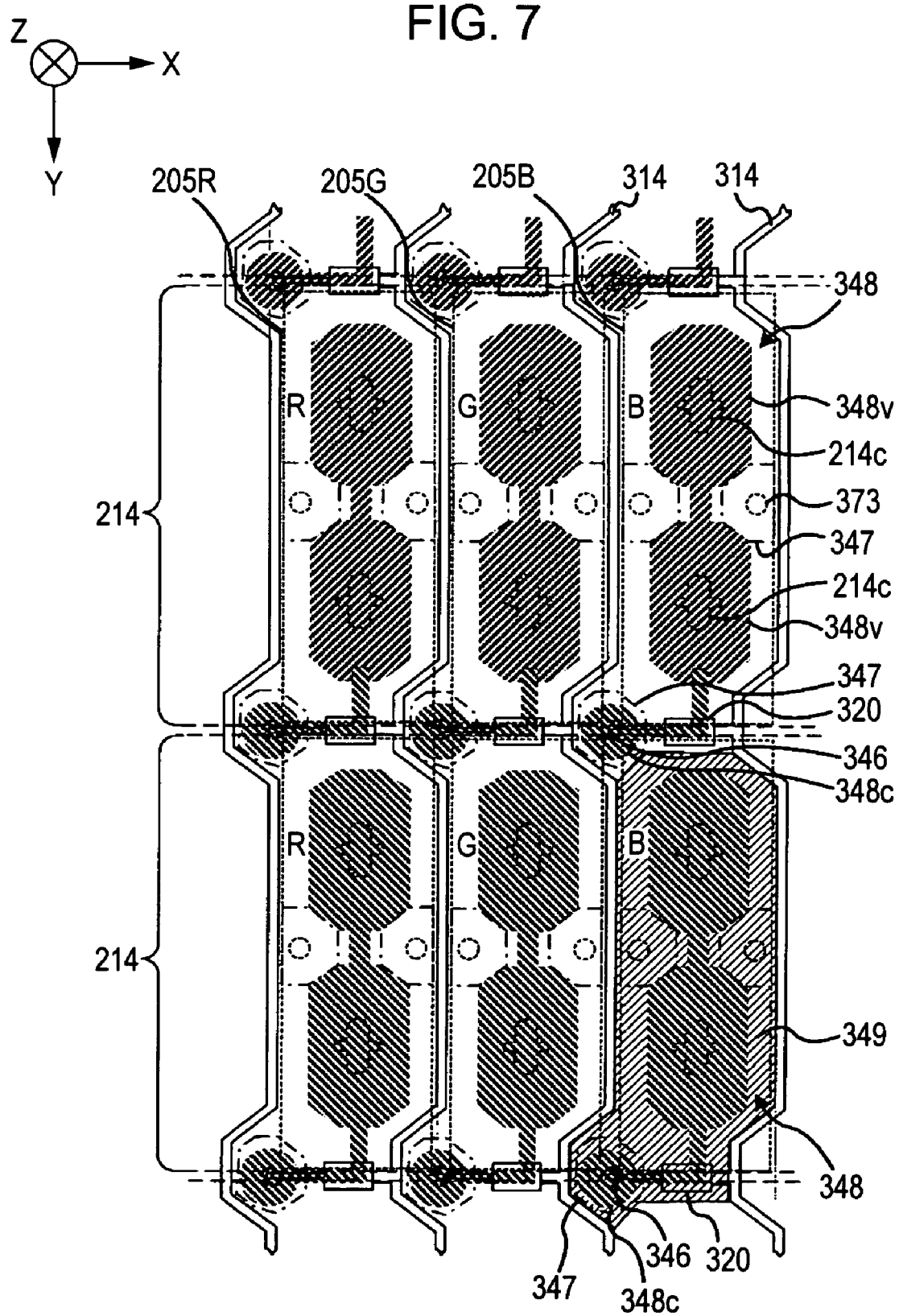
FIG. 7 is a plan view showing the structure of pixel electrodes according to a second embodiment.

Next, a second embodiment of the invention will be described below with reference to FIG. 7. FIG. 7 is a plan view showing a layout of a plurality of pixel electrodes 348 in a pixel structure according to the second embodiment. The structure of a liquid crystal display device according to the second embodiment is similar to the liquid crystal display device 100 according to the first embodiment. Accordingly, components similar to those in the liquid crystal display device 100 of the first embodiment are denoted by the same reference numerals, and explanations thereof are thus omitted.

First, differences between the second embodiment and the first embodiment will be described below. In the liquid crystal display device according to the second embodiment, the pixel structure is slightly different from that in the first embodiment. More specifically, in the first embodiment, the pixel electrode 348 formed in each of the sub-pixel areas 349 includes three sub-pixel electrodes 348*u*. In comparison, in the second embodiment, a pixel electrode 348 including two sub-pixel electrodes 348*v* is formed in each sub-pixel area 349. In addition, the size of a single sub-pixel electrode 348*v* in the second embodiment is larger than the size of a single sub-pixel electrode 348*u* in the first embodiment.

In addition, in the first embodiment, each of the openings 214*a*, which are formed in the scan lines 214 on the substrate 200 at the substantially central areas of the sub-pixel electrodes 348*u*, has a substantially circular shape in a plan view. In comparison, in the second embodiment, scan lines 214 on a substrate 200 have openings 214*c* which each has a substantially cross shape in a plan view at substantially central areas of the sub-pixel electrodes 348*v*.

In addition, as shown in FIG. 7, spacers 373 are provided between two sub-pixel electrodes 348*v* which are adjacent to each other in the Y direction. Accordingly, the cell gap is uniform in each sub-pixel area 349. In addition, a black light-shading film 347 on the substrate 200 extends so as to cover the positions corresponding to the spacers 373. Accordingly, light leakage due to the spacers 373 is prevented. In addition, although the spacers 373 are not provided in the sub-pixel areas 349 in the liquid crystal display device 100 according to the above-described first embodiment, the spacers 373 may also be provided in the sub-pixel areas 349 of the liquid crystal display device 100. In such a case, the black light-shading film 347 on the substrate 200 preferably extends so as to cover the positions corresponding to the spacers 373 in order to prevent the light leakage due to the spacers 373.

Next, the structure common to the first and second embodiments will be described below. In the second embodiment, positions where contact holes 346, which characterize the invention, are disposed are the same as those in the first embodiment. More specifically, as shown in FIG. 7, the contact holes 346 are formed at corners of the sub-pixel areas 349. Therefore, the liquid crystal display device according to the second embodiment provides advantages similar to those provided by the liquid crystal display device 100 according to the first embodiment. Thus, the pixel structure may be modified in various ways as long as the contact holes 346 are formed at positions where the pixel electrodes 348 do not overlap the contact holes 346 in the sub-pixel areas 349.

Therefore, according to the second embodiment, the liquid crystal in an area corresponding to the sub-pixel electrodes 348*v*, that is, in the effective display area which defines a display section, is not easily influenced by the disturbance in the liquid crystal alignment generated at the contact hole 346. Accordingly, the disturbance in the liquid crystal alignment in the effective display area is prevented. As a result, in the liquid crystal display device according to the second embodiment of the invention, unevenness in the display, afterimage/burn-in, reduction in the response speed in drive control, etc., are prevented and the quality of the displayed image is improved. In addition, since the contact holes 346 are formed at positions where the pixel electrodes 348 do not overlap the contact holes 346, reduction in the opening ratio is prevented.

Third Embodiment

Figure 8:
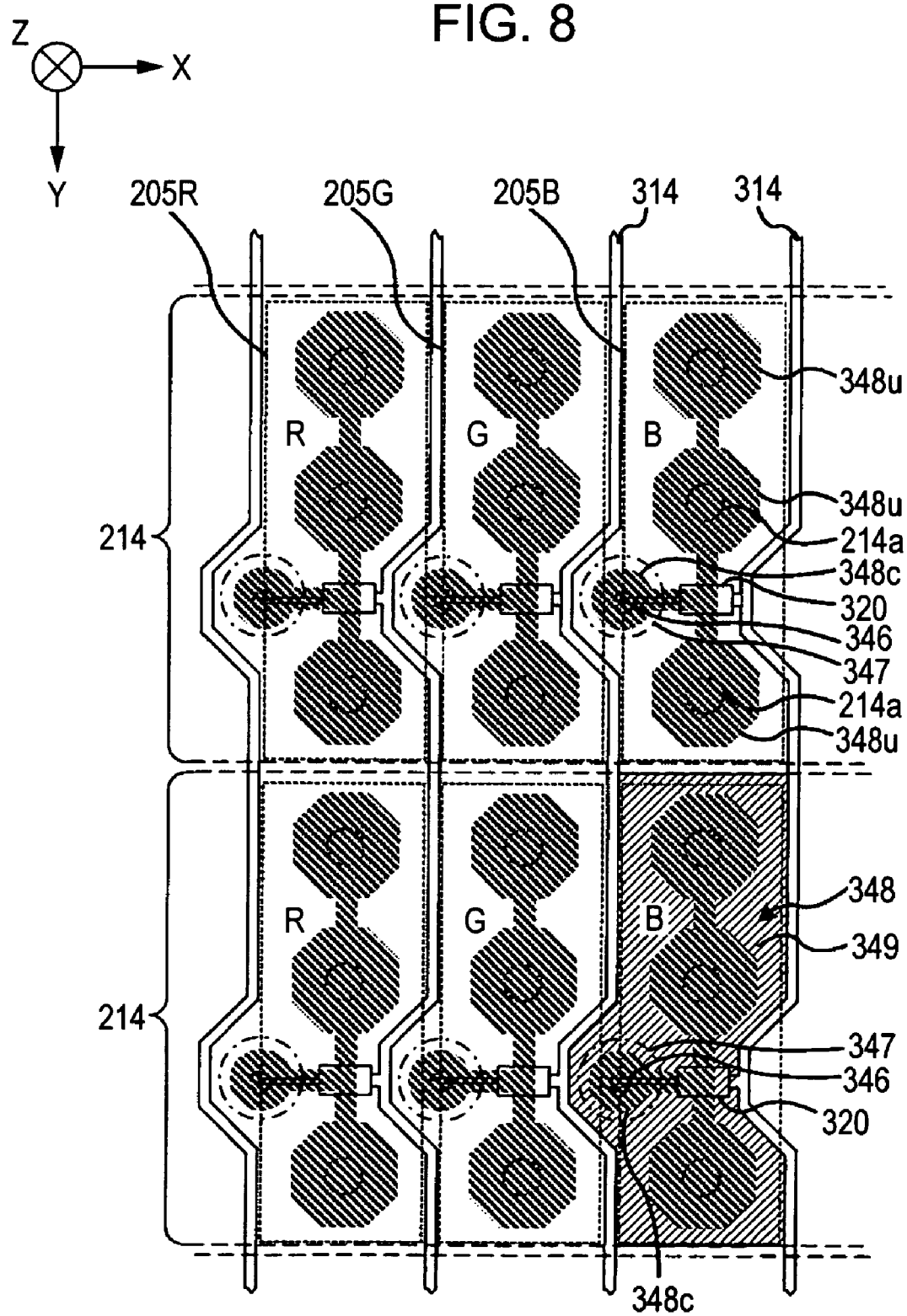
FIG. 8 is a plan view showing the structure of pixel electrodes according to a third embodiment.

Next, a third embodiment of the invention will be described below with reference to FIG. 8. FIG. 8 is a plan view showing a layout of a plurality of pixel electrodes 348 in a pixel structure according to the third embodiment. The structure of a liquid crystal display device according to the third embodiment is similar to the liquid crystal display device 100 according to the first embodiment. Accordingly, components similar to those in the liquid crystal display device 100 of the first embodiment are denoted by the same reference numerals, and explanations thereof are thus omitted.

In the liquid crystal display device according to the third embodiment, a pixel structure, in particular, positions where contact holes 346, which characterize the invention, are disposed are different from those in the first embodiment. In the first embodiment, each contact hole 346 is disposed at a farthest position from the pixel electrode 348 in the corresponding sub-pixel area 349, more specifically, at a corner of the sub-pixel area 349. In comparison, in the third embodiment, each contact hole 346 is disposed at a farthest position from the pixel electrode 348 in the corresponding sub-pixel areas 349, more specifically, at a position between two sub-pixel electrodes 348u adjacent to each other in the direction in which the data lines 314 extend.

Accordingly, the distance from the contact hole 346 to the two adjacent sub-pixel electrodes 348u is set as long as possible. Accordingly, the liquid crystal display device according to the third embodiment provides advantages similar to those provided by the liquid crystal display device 100 according to the first embodiment. Thus, the pixel structure may be modified in various ways as long as the contact holes 346 are formed at positions where the pixel electrodes 348 do not overlap the contact holes 346 in the sub-pixel areas 349.

Therefore, according to the third embodiment, the liquid crystal in an area corresponding to the sub-pixel electrodes 348u, that is, in the effective display area which defines a display section, is not easily influenced by the disturbance in the liquid crystal alignment generated at the contact hole 346. Accordingly, the disturbance in the liquid crystal alignment in the effective display area is prevented. As a result, in the liquid crystal display device according to the third embodiment of the invention, unevenness in the display, afterimage/burn-in, reduction in the response speed in drive control, etc., are prevented and the quality of the displayed image is improved. In addition, since the contact holes 346 are formed at positions where the pixel electrodes 348 do not overlap the contact holes 346, reduction in the opening ratio is prevented.

Fourth Embodiment

Figure 9:
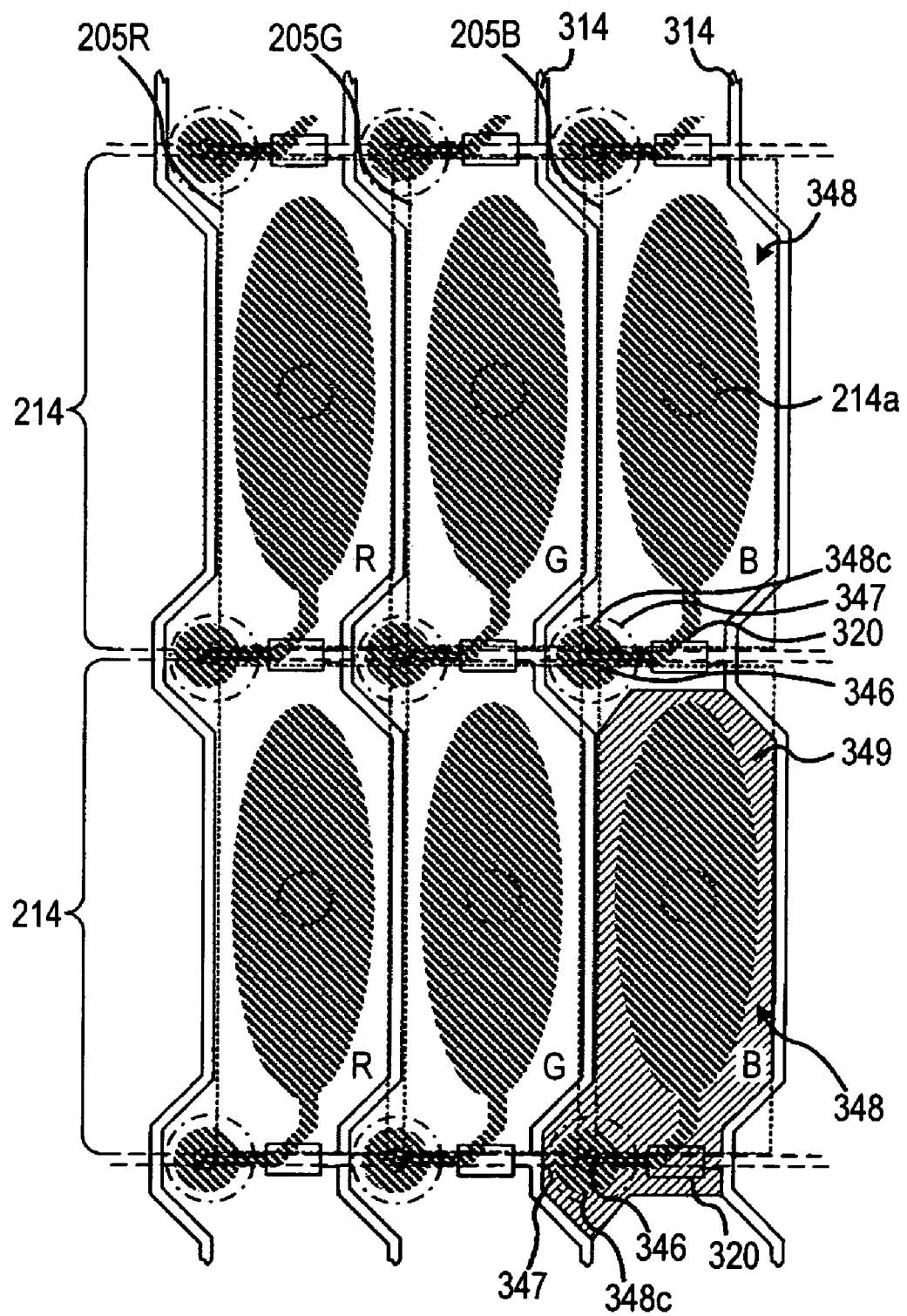
FIG. 9 is a plan view showing the structure of pixel electrodes according to a fourth embodiment.

Next, a fourth embodiment of the invention will be described below with reference to FIG. 9. FIG. 9 is a plan view showing a layout of a plurality of pixel electrodes 348 in a pixel structure according to the fourth embodiment. The structure of a liquid crystal display device according to the fourth embodiment is similar to the liquid crystal display device 100 according to the first embodiment. Accordingly, components similar to those in the liquid crystal display device 100 of the first embodiment are denoted by the same reference numerals, and explanations thereof are thus omitted.

First, differences between the fourth embodiment and the first embodiment will be described below. In the liquid crystal display device according to the fourth embodiment, the shape of each pixel electrode 348 is different from that in the first embodiment. More specifically, in the first embodiment, each pixel electrode 348 disposed in the corresponding sub-pixel area 349 includes three sub-pixel electrodes 348u. In comparison, in the fourth embodiment, an integral, substantially elliptical pixel electrode 348 is disposed in each sub-pixel area 349.

Next, the structure common to the first and fourth embodiments will be described below. In the fourth embodiments, positions where contact holes 346, which characterize the invention, are disposed are similar to those in the first embodiment. Therefore, the liquid crystal display device according to the fourth embodiment provides advantages similar to those provided by the liquid crystal display device 100 according to the first embodiment. Thus, the pixel structure may be modified in various ways as long as the contact holes 346 are formed at positions where the pixel electrodes 348 do not overlap the contact holes 346 in the sub-pixel areas 349.

Therefore, according to the fourth embodiment, the liquid crystal in an area corresponding to the pixel electrodes 348, that is, in the effective display area which defines a display section, is not easily influenced by the disturbance in the liquid crystal alignment generated at the contact hole 346. Accordingly, the disturbance in the liquid crystal alignment in the effective display area is prevented. As a result, in the liquid crystal display device according to the fourth embodiment of the invention, unevenness in the display, afterimage/burn-in, reduction in the response speed in drive control, etc., are prevented and the quality of the displayed image is improved. In addition, since the contact holes 346 are formed at positions where the pixel electrodes 348 do not overlap the contact holes 346, reduction in the opening ratio is prevented.

Modifications

Figure 10:
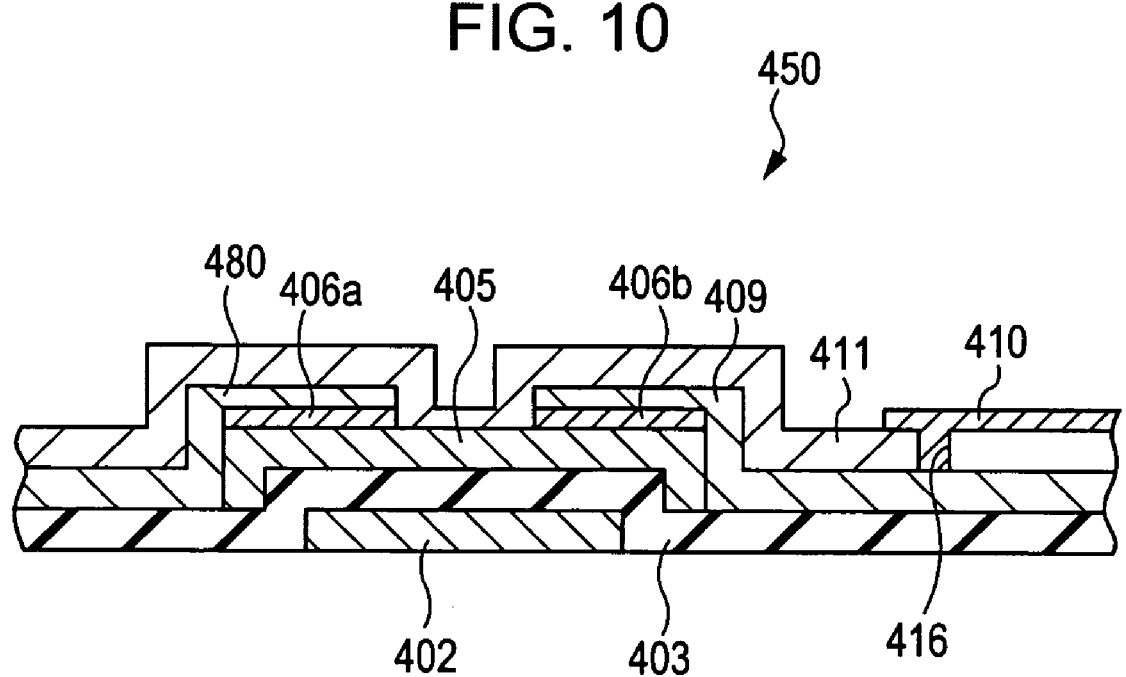
FIG. 10 is a sectional view showing a modification of a switching device.

Although the thin film diodes (TFD) are used as switching devices in the above-described embodiments, the invention is not limited to this. FIG. 10 shows a sectional view of an amorphous thin film transistor (TFT) as another example of a switching device. With reference to FIG. 10, a TFT 450 includes a gate electrode 402 branched from a gate line (not shown) and a gate insulating film 403 which covers the gate electrode 402. An a-Si layer 405 is provided on the gate insulating film 403 so as to overlap the gate electrode 402. In addition, $n^+$-a-Si layers 406a and 406b, which are separated from each other, are provided on the a-Si layer 405. A source electrode 408 branched from a source line (not shown) is provided on the $n^+$-a-Si layer 406a, and a drain electrode 409 is provided on the $n^+$-a-Si layer 406b. A protecting film 411 covers the above-described layers, and a pixel electrode 410 is provided on the protecting film 411 such that the pixel electrode 410 partially overlaps the drain electrodes 409 in a plan view. The drain electrode 409 and the pixel electrode 410 are electrically connected to each other via a contact hole 416.

The invention may also be applied to a connecting portion between the drain electrode 409 and the pixel electrode 410 in the above-described amorphous TFT used as a switching device. More specifically, the invention may also be applied to a structure in which the drain electrode 409 is used as a wiring portion corresponding to the second metal film 336 in the above-described embodiments.

In addition, although the liquid crystal having a negative dielectric anisotropy is used in the above-described embodiments, other types of liquid crystals, such as twisted nematic (TN) liquid crystal, may also be used.

Electronic Apparatus

Next, an example in which the liquid crystal display device according to the embodiments of the invention is used as a display device of an electronic apparatus will be described below.

Figure 11:
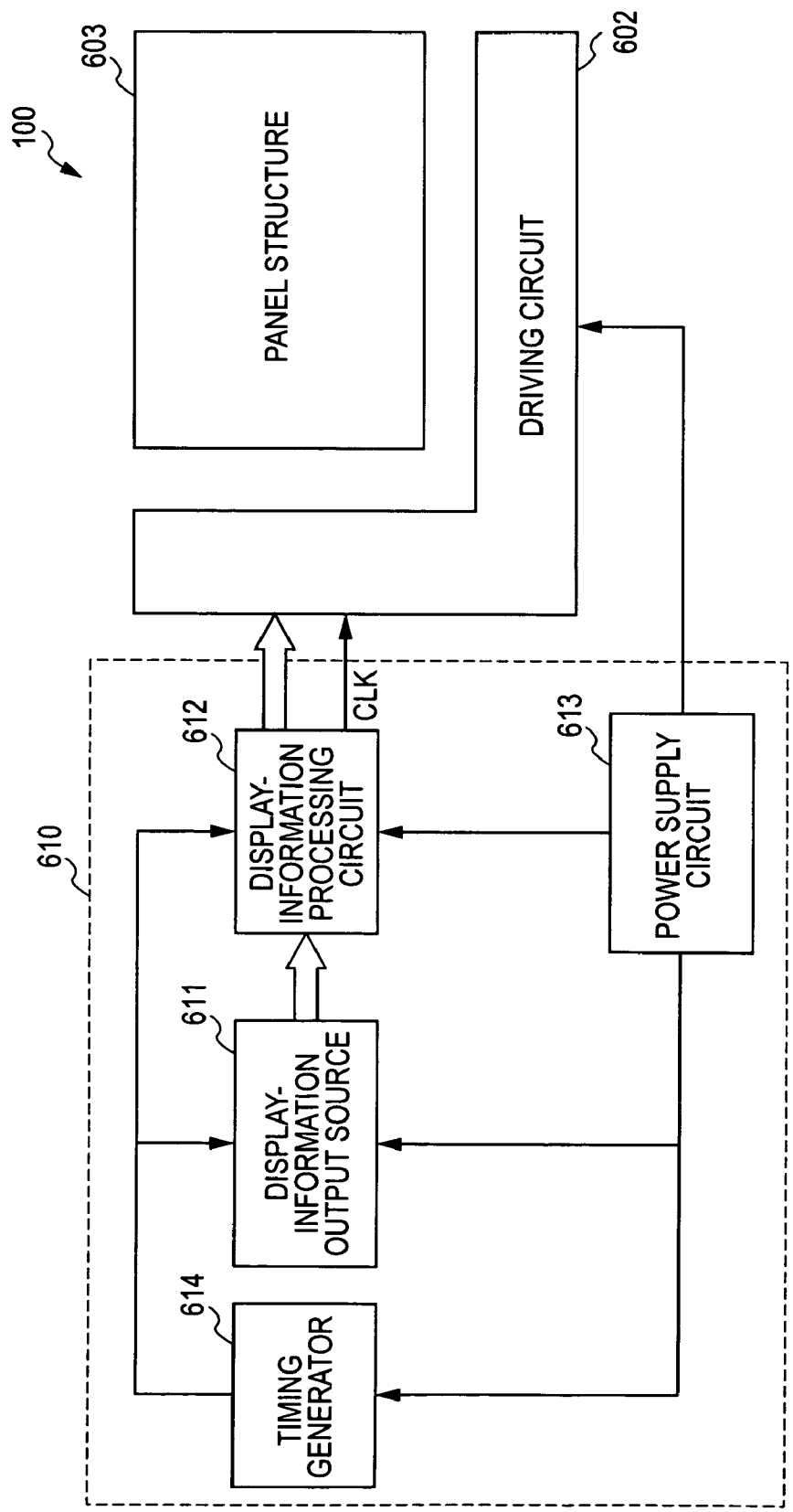
FIG. 11 is a block diagram showing a circuit structure of an electronic apparatus including a liquid crystal display device.

FIG. 11 is a block diagram showing the overall structure of the electronic apparatus. The electronic apparatus includes the above-described liquid crystal display device 100 and a controller 610 for controlling the liquid crystal display device 100. In the figure, the liquid crystal display device 100 is divided into a panel structure 603 and a drive circuit 602 including an semiconductor IC or the like. The controller 610 includes a display-information output source 611, a display-information processing circuit 612, a power source circuit 613, and a timing generator 614.

The display-information output source 611 includes a memory unit including a read only memory (ROM), a random access memory (RAM), etc., a storage unit including a magnetic recording disc, an optical recording disc, etc., and a tuning circuit which outputs a synchronized digital image signal. The display-information output source 611 supplies display information to the display-information processing circuit 612 in the form of image signals with a predetermined format in response to various clock signals generated by the timing generator 614.

The display-information processing circuit 612 includes various known circuits such as a serial/parallel converter circuit, an amplifier/inverter circuit, a rotation circuit, a gamma correction circuit, and a clamp circuit. The display-information processing circuit 612 processes the input display information, and supplies the image information to the drive circuit 602 together with the clock signals CLK. The drive circuit 602 includes a scan-line driving circuit, a data-line driving circuit, and a test circuit. In addition, the power supply circuit 613 supplies a predetermined voltage to each of the above-described devices.

Next, examples of electronic apparatuses including the liquid crystal display device 100 according to the embodiments of the invention will be described below with reference to FIG. 12.

Figure 12A:
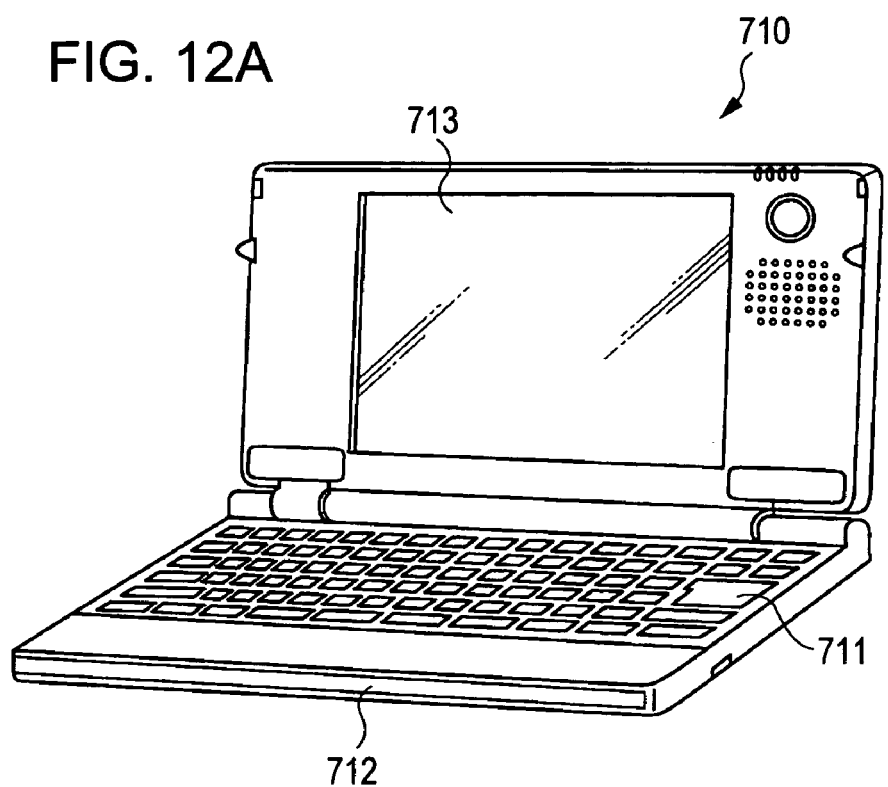
FIGS. 12A and 12B show examples of electronic apparatuses.

First, an example in which the liquid crystal display device 100 according to the embodiments of the invention is applied to a display unit of a portable personal computer (so-called notebook computer) will be described below. FIG. 12A is a perspective view showing the structure of the personal computer. With reference to FIG. 12A, a personal computer 710 includes a main body 712 having a keyboard 711 and a display unit 713 incorporating the liquid crystal display panel according to the embodiments of the invention.

Figure 12B:
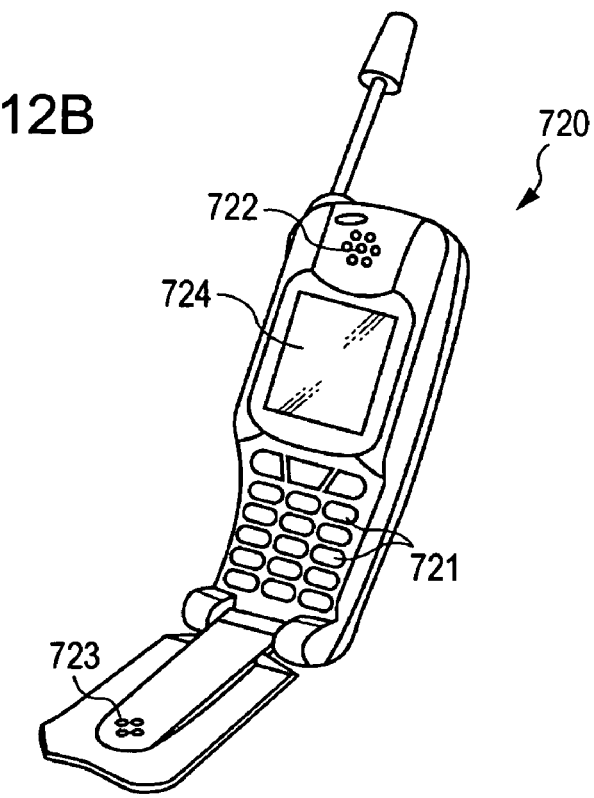

Next, an example in which the liquid crystal display device 100 according to the embodiments of the invention is applied to a display unit of a mobile phone will be described below. FIG. 12B is a perspective view showing the structure of the mobile phone. With reference to FIG. 12B, a mobile phone 720 includes a plurality of operation buttons 721, an ear piece 722, a mouthpiece 723, and a display unit 724 incorporating the liquid crystal display device 100 according to the embodiments of the invention.

In addition to the personal computer shown in FIG. 12A and the mobile phone shown in 12B, the liquid crystal display device 100 according to the embodiments of the invention may also be applied to other electronic apparatuses such as liquid crystal televisions, video tape recorders with view finders or monitors, car navigation systems, pagers, electronic organizers, electronic calculators, word processors, work stations, videophones, point-of-sale (POS) terminals, and digital still cameras.

What is claimed is:

1. A liquid crystal device comprising:

a pair of substrates including a first substrate and second substrate; and a liquid crystal layer including a negative dielectric anisotropy and interposed between the first substrate and second substrate, wherein the first substrate has a data line including a linear first section and a second circumventing section, a switching device connected to the data line, an insulating film formed over the data line and the switching device, the insulating film including a contact hole at a position aligned with the linear first section of the data line and such that the second circumventing section of the data line circumvents the contact hole, a pixel electrode formed over the insulating film, and a wire extending from the pixel electrode, the wire being connected to the switching device through the contact hole.

2. The liquid crystal device according to claim 1, wherein one of the first and second substrates includes a light-shading film at a position where the light-shading film overlaps the contact hole.

3. The liquid crystal device according to claim 1, wherein the contact hole is formed at a farthest position from the pixel electrode in a pixel area.

4. The liquid crystal device according to claim 1, wherein the contact hole is formed at a corner of a pixel area.

5. The liquid crystal device according to claim 1, wherein the pixel electrode includes a plurality of sub-pixel electrodes, the sub-pixel electrodes being electrically connected to each other and being arranged in a direction in which the data line extends, and wherein the contact hole is positioned between two of the sub-pixel electrodes which are adjacent to each other in the direction in which the data line extends.

6. The liquid crystal device according to claim 5, wherein the second substrate has openings or protrusions at positions corresponding to substantially central areas of the sub-pixel electrodes.

7. An electronic apparatus comprising the liquid crystal device according to claim 1.

* * * * *